Dec. 5, 1967     H. B. SHAPER     3,356,795
STEREOPHONIC MAGNETIC PHONOGRAPH PICKUP CARTRIDGE
Filed Nov. 5, 1964     5 Sheets-Sheet 1

INVENTOR.
HARRY B. SHAPER
BY
OSTROLENK, FABER, GERB & SOFFEN
ATTORNEYS

Dec. 5, 1967 H. B. SHAPER 3,356,795
STEREOPHONIC MAGNETIC PHONOGRAPH PICKUP CARTRIDGE
Filed Nov. 5, 1964 5 Sheets-Sheet 2

INVENTOR.
HARRY B. SHAPER
BY
OSTROLENK, FABER, GERB & SOFFEN
ATTORNEYS

INVENTOR.
HARRY B. SHAPER
BY
OSTROLENK, FABER, GERB & SOFFEN
ATTORNEYS

Dec. 5, 1967 H. B. SHAPER 3,356,795
STEREOPHONIC MAGNETIC PHONOGRAPH PICKUP CARTRIDGE
Filed Nov. 5, 1964 5 Sheets-Sheet 4

INVENTOR.
HARRY B. SHAPER
BY
OSTROLENK, FABER, GERB & SOFFEN
ATTORNEYS

Dec. 5, 1967     H. B. SHAPER     3,356,795

STEREOPHONIC MAGNETIC PHONOGRAPH PICKUP CARTRIDGE

Filed Nov. 5, 1964     5 Sheets-Sheet 5

INVENTOR.
HARRY B. SHAPER

BY
OSTROLENK, FABER, GERB & SOFFEN
ATTORNEYS

United States Patent Office 3,356,795
Patented Dec. 5, 1967

3,356,795
STEREOPHONIC MAGNETIC PHONOGRAPH PICKUP CARTRIDGE
Harry B. Shaper, East Hills, N.Y., assignor to Dyna-Empire, Inc., Garden City, N.Y., a corporation of New York
Filed Nov. 5, 1964, Ser. No. 409,143
13 Claims. (Cl. 179—100.41)

ABSTRACT OF THE DISCLOSURE

A stereophonic magnetic phonograph pickup having a permanent magnet armature mounted for vibration within a gap common to individual electromagnetic systems for each stereo channel is constructed with a bearing means including relatively stiff metal portions in point contact engagement with the armature to achieve better control of armature position and vibration relative to the pole faces of the electromagnetic systems. The bearing means also includes an elastomer having a primary function of damping vibration.

---

The invention relates to stereophonic phonograph pickup cartridges or pickups which came into vogue and general use toward the end of 1958. More particularly, the invention relates to such stereophonic pickups operating with an electromagnetic transducing system of the type disclosed in U.S. Patent 2,875,282 of Reiback. The Reiback streophonic pickup has two core systems each with a pair of core poles interlinked with transducing windings and defining a pole gap and the two pairs of core poles faces form a common gap within which the stylus-driven armature is vibrated for generating in the windings of the two core systems two stereophonic signal sequences corresponding to the two stereophonic record channels on the opposite faces of the reproduced record groove.

U.S. Patent 2,622,156 of Baker discloses a monophonic electromagnetic phonograph pickup with a replaceable stylus driven armature assembly wherein the magnetic armature is supported by a surrounding rubber or elastomer bearing for vibration in the magnetic pole gap of the core system and a wire spring is connected to the vibratory armature to provide the elastic restoring forces and maintain it in the centered or neutral position. U.S. Patent 2,917,590 of Stanton describes an elactromagnetic pickup with a replaceable stylus driven armature similar to that of Baker wherein a torsion wire spring returns the armature to its centered or neutral position within the core gap and an armature-surrounding and contacting elastomer body (at 63 in FIGS. 14-17) dampens the resonance peaks of its resonant vibratory mode. U.S. Patent 2,507,708 discloses that in a monophonic electromagnetic pickup it is desirable to provide a stylus driven permanent magnet armature with a rubber bearing support for vibrating it along a midportion thereof within the core gap.

In adapting the features of the foregoing prior electromagnetic monophonic pickups to the analogous stereophonic pickups of the type described in the Reiback patent, it was heretofore believed essential to hold the stylus-driven vibratory armature within the core gaps on a surrounding elastomer bearing in order to secure the required freedom of its armature motion and its accurate operative vibratory spacing from the four pole faces of the common core gap. The minute core gap dimensions limited the volume of the elastomeric bearing body thereby limiting its effectiveness and stability as operative vibratory armature spacing and bearing support within the common core gap.

Among the objects of the invention is a sterephonic magnetic pickup cartridge of the foregoing type having a stylus-driven armature assembly which avoids reliance on a minute elastomer bearings for accurate operative positioning of the armature with the required freedom of motion within and at accurate spacing from the four pole faces of the common gap of such two-core magnetic transducing systems.

In the stereophonic stylus-driven armature assembly of the invention a stiff tubular armature support has an elastically deformed spring connection to the armature and also stiff radially inward bearing projections assuring positive and accurately spaced bearing support of the armature with required freedom of vibratory motion within the four pole core gap for playing back stereophonic groove records with high-fidelity and maximum channel separation. The armature with its wire spring connection to its support form a vibratory system having its own resonant vibratory peak, the resonant peak of which is damped by an elastomer damping body engaging an exposed side portion of the vibratory armature.

In practical embodiments of the invention pointed bearing ends of two radially stiff angularly displaced inward side wall projections of the support tube provide in conjunction the deformed wire spring connection the required bearing support and freedom of vibratory motion for the stylus-driven armature. Such vibratory armature assembly is also of great value in stereophonic pickups wherein the two core systems have their respective pole faces axially displaced along the armature on opposite sides of plane with pole face pairs of the two core systems arrayed, usually perpendicularly to and adjacent to each other along complementary adjacent side walls of the armature support tube.

The foregoing and other objects of the invention will be best understood by the following description of exemplifications thereof, reference being had to the accompanying drawings wherein.

Figure 1:
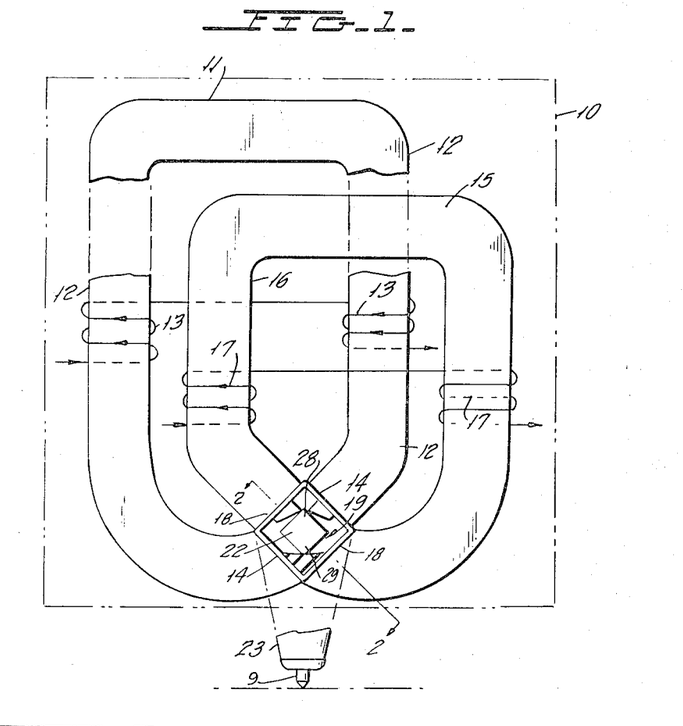
FIG. 1 is a diagrammatic front view of a stereophonic electromagnetic pickup of the type suitable for operation with an armature assembly exemplifying the invention.
Figures 2, 3:
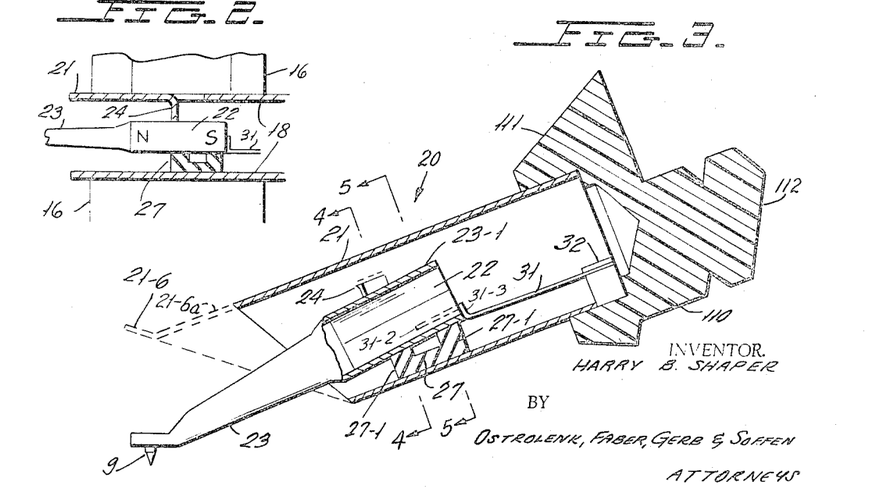
FIG. 2 is a diagrammatic side view seen along lines 2—2 of FIG. 1 of the operative relation of the armature to one pair of pole end faces and the armature assembly thereof.
FIG. 3 is an elongated cross-sectional view similar to FIG. 2 of one replaceable armature assembly exemplifying the invention.

FIGS. 1 and 2 show diagrammatically the principal elements of the electromagnetic core systems of stereophonic pickup cartridge having two pairs of pole ends defining a common four-pole air gap together with a diagrammatic view of a replaceable stylus-driven armature assembly exemplifying the invention. Such pickup generally designated 10 may have a mounting body of nonmagnetic material, for instance, synthetic resin enclosed in a magnetic shield indicated by the outer dash-double-dot line. Within the cartridge are suitably mounted two electromagnetic core systems 11, 15 each having two opposite core poles 12 and 16, respectively, interlinked with respective transducer windings 13 and 17.

The two core poles 12 of core system 11 have two opposite pole end faces 14. The two core poles 16 of the other core system 15 likewise have two opposite pole faces 18. In the cartridge of FIG. 1, the two core systems 11, 15 are so arranged that their two respective pairs of pole faces 14 and 18 form a common four-pole core gap 19. Such two core systems 11, 15 may be provided with permanent magnetizing means, for instance, as described in Patent 2,511,663 (of Bachman) or 2,622,156 (of Baker) for inducing in their respective core gaps unidirectional magnetic flux fields. In the specific stereophonic pickup of FIG. 1 the two core systems 11, 15 are designed for cooperation with a permanently magnetized armature 22 such as described, for instance, in Patent 2,507,708 (of Greener) and arranged to vibrate between two pairs of core gaps 14 and 18 for inducing in their respective core windings 13 and 17 signals corresponding to the different vibratory motion components of the armature 22 relatively to the two pairs of pole faces 14 and 18.

FIG. 2 indicates diagrammatically the relation of the elongated armature 22 to one pair adjacent pole end faces 18 of core system 11. The armature 22 is shown permanently magnetized in the direction of its length by conventional N and S symbols. When such armature 22 is vibrated by the stylus arm 23 around a portion of its length, its opposite N and S pole ends will alternately approach the opposite core pole end faces 18 and thereby induce in the associated core windings 17 electric signals corresponding to such armature vibrations.

Figure 4:
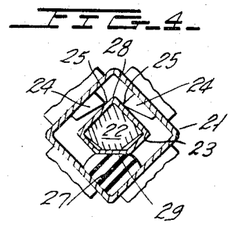
FIGS. 4 and 5 are cross-sectional views of the armature assembly of FIG. 3 along lines 4—4 and 5—5 thereof respectively.
Figure 5:
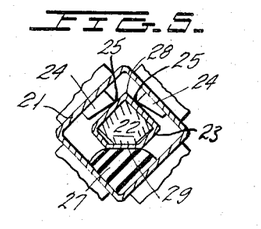

FIGS. 3 to 5 show the structure of one form of a replaceable stylus-driven armature assembly of the invention adapted for operation with high-fidelity and high channel separation within a stereophonic two-core system pickup cartridge of the type described above. The replaceable armature assembly generally designated 20 comprises tubular mounting or support member 21 with a cross-section shaped to fit for insertion into and be retained within the four-pole common gap socket recess 19 of the cartridge and the two core systems 11, 15. An armature 22 carrying affixed thereto a hollow stylus arm 23 with its stylus 9 forms with an elastically deformed spring wire member 31 a vibratory system carried within support tube 21 so that the stylus-driven armature 22 shall vibrate along their central vertical plane of symmetry within the common four-pole core gap 19 with the required high freedom of motion. The front end of the spring wire 31 is affixed as by strong cement or solder to rearward central bottom end of the armature 22. The rear end of the spring wire 31 is similarly affixed to a central inward bracket projection 32, of the support tube 21 in the plane of symmetry of the four-pole core gap 19. The spring wire 31 is originally permanently deformed in vertically upward direction, so upward bias forces then urge the armature into engagement with the overlying upper surfaces of support tube 21, as seen in FIGS. 3 to 5.

In accordance with the invention, accurate positioning of the armature 22 to the four-pole faces of the common gap 19 with the required great freedom of vibratory motion is secured by one or more stiff inward radial point projections of the mounting or support tube 21.

Figure 5A:
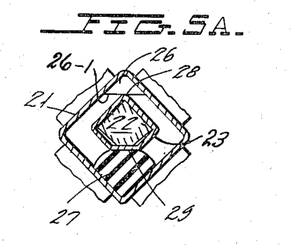
FIG. 5A is a cross-sectional similar to FIG. 5 of an armature assembly of the invention having a modified vibratory bearing and spacing support for the stylus-driven armature.

To assure ideal maximum freedom of motion, the mounting or support tube 21 should have only one stiff radial inward bearing projection—such as indicated at 26 in FIG. 5A—shown engaging with its inward edge 26–1 an upwardly facing corner edge portion of the armature 22 under the upward pressure forces applied by the central connection of its vibratory spring wire member 31 to the central bracket portion 32 of its tubular support member 21.

However, it is difficult to assure stable bearing engagement between the upward corner edge portion (or a rounded upward portion) of the armature 22 and a downwardly facing bearing edge of a mounting projection 26–1 of the type shown in FIG. 5A. Stable positioning of such armature 22 and such bearing projection 26–1 could be secured by forming in the upwardly facing side of the armature 22 an outwardly tapering recess of small depth such as .005" for bearing engagement with a facing edge portion 26–1 of the inward tube projection 26 (FIG. 5A). Such armature bearing support combination does not lend itself readily for large scale production with a required uniform quality.

In accordance with the invention, large scale production of such replaceable armature assemblies operating with a required great freedom of armature vibration approaching the ideal conditions and also accurate armature spacing is secured by providing the armature support tube 21 with two inward downwardly pointed stiff bearing projections 24 of the surrounding stiff mounting tube 21 against which the armature is held by elastic restoring forces of the spring wire 31, with which it is carried within the support tube 21.

FIGS. 3–5 show one example of such vibratory armature support of the invention. The two upwardly facing planar side walls of mounting tube 21 have radially inward stiff wall projections 24. Each of the inward radial projections 24 is provided with a pointed inward end 25 engaging upwardly facing adjacent nodal surface portions of the armature 22 near the upper armature corner edge 28, as seen in FIGS. 1 to 5.

The armature spring wire connection 31 to the support tube 21 is initially permanently deformed in upward direction from its position seen in FIG. 3, from which it is elastically deflected to the downward operating position seen in FIG. 3. Such downward elastic deformation of armature wire connection 31 to its tube support 21 assures that the elastic restoring forces of the wire spring with bias, urge and maintain the intermediate nodal upper surface portion of armature 22 in bearing engagement with the adjacent downward pointed end of its support bearing projections 24 on which the armature carrying arm 23 is vibrated for resolving the stylus motion into two motion components in the directions of the two pairs of core pole faces 14 and 18.

Figure 12:
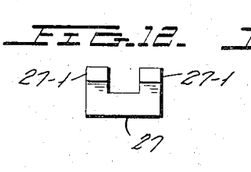
FIG. 12 is a side elevation of the elastomer damping body of the armature assembly of FIG. 3.
Figure 13:
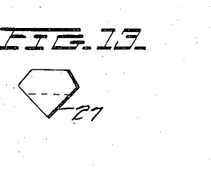
FIG. 13 is an end view thereof.

The mass of the armature 22 and of the stylus arm 23 and stylus 9 forms with its spring wire connection 31 to its mounting support 21 a vibratory system having its own resonance frequency which is selected to determine the lower end of the frequency response of the pickup cartridge. In order to suppress or damp the resonant peaks of this vibratory system, an elastomer damping body 27 is cemented to the exterior of the armature 22 and held in peak damping engagement between the vibrating armature and a facing portion of the surrounding tube support. In the form shown in FIG. 3, and in detail FIGS. 12, 13, the elastomer damping body 27 extends longitudinally along the downward surface of the armature 22. Two spaced upward arms 27–1 of elastomer body 27 are cemented to the outer wall surface of the armature 22 (or its stylus arm enclosure wall), the rearward elastomer arm being at a distance from the nodal armature portion engaging the bearing projections 24 of its mounting support 21. The outer surface of elastomer body engages the surrounding walls of the support tube 21 for causing the elastomer body to dampen and suppress resonant peak vibratory motion of the armature-spring wire system.

The resilient torsion spring wire 31 forms its opposite ends affixed to portions of the armature 22 and the support tube which lie in the vertical center plane, the two core systems as is indicated by the vertical center line through the four core pole gap 19. The elastic restoring forces of torsion wire armature connection 31 return the armature 22 to its neutral position as it vibrated with the required great freedom of motion with a minimum of friction on its closely spaced pointed bearing supports. However, the torsion wire connection 31 of the armature 22 may shape and its outer end may be affixed to a portion of tubular support arm 23 underlying the armature 22.

With the above described arrangement, its downwardly elastically deformed spring wire connection 31 to the support tube 21 biases the intermediate upwardly facing nodal portion of the armature 22 into engagement with the two adjacent downwardly pointed stiff bearing projections 24 of the support or mounting tube 21 for giving the armature 22 freedom of vibratory motion approaching the ideal condition within the common four pole gap 19 of the two core systems 11, 15 while securing accurate spacing of the vibratory armature from the two pairs of pole faces 14 and 18. The resonant peaks of the vibratory system formed by the movable masses 22, 23, 9 and by its wire spring connection 31 to the support is suppressed by the elongated elastomer body 27 placed lengthwise between its support tube and a facing exterior vibratory portion of the armature 22.

To enable ready practice of the invention, and as examples only, there are given below specific data of one form of practical replaceable stylus-armature assembly of the type described above.

Figure 6:
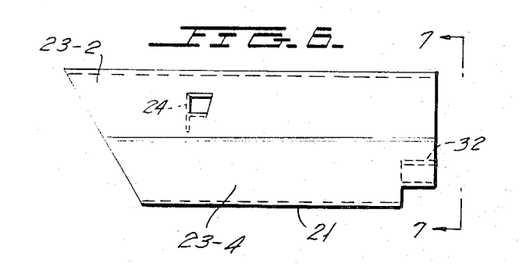
FIG. 6 is a side-elevation view of the mounting or support tube of the armature assembly of FIGS. 3 to 5.
Figure 7:
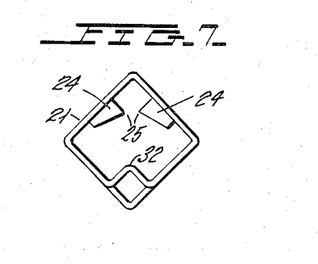
FIG. 7 is an end view along lines 7—7 of FIG. 6.
Figure 8:
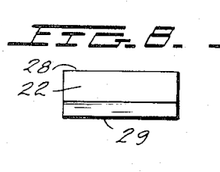
FIG. 8 is a side elevation of the armature of FIG. 3.
Figure 9:
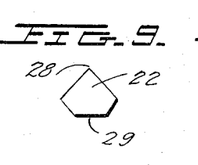
FIG. 9 is an end view of the armature of FIG. 8.

Although it may be made of stainless steel, the support or mounting tube 21 is of a hard brass sheet metal about .003″ thick, it has a square cross-section with the opposite side walls shaped to have a frictional fit within the common four-pole gap and recess 19 of the cartridge. The spacing between the opposite pairs of side walls of such mounting tube is .091″ corresponding to the gap spacing between each of the opposite pole faces of each core system. The armature 22 may have a square cross-section and is held within the mounting tube 21 so that one diagonal of the armature extends in vertical plane within the correspondingly shaped and oriented mounting tube 21 with the other diagonal of the armature and mounting tube cross-section extending horizontally (FIGS. 4, 5). The inward armature pivot projections 24 of the mounting structure 21 may be formed by a conventional cutting and deforming tool applied to mounting tube 21 body (FIGS. 6 and 7), and seen in the assembly of FIGS. 3 to 5. The support bracket 32 for torsion member 31 may be provided by cutting and inwardly deforming the bottom rear corner end 32 of the mounting tube 21 (FIGS. 6, 7).

The specific form of replaceable armature stylus assembly of FIGS. 3 to 5 as described above may be designed so that its mounting tube 21 may be inserted within the common gap socket 19 of the cartridge 10, and its core assembly either from the front end of the cartridge as it is seen in FIG. 1 or from the rear end of a separable front section of the cartridge, for instance, of the type described hereafter (FIGS. 16–23). If designed for insertion into the common core gap of a two-core assembly from the front side of the cartridge, the mounting tube 21 may be provided with a frontward extension as 21–6a shown in dash lines in FIG. 3 projecting over the front part of the stylus arm 23 and having an outwardly projecting grip 21–6 by which it may be gripped for removing of the armature assembly 20 from, or inserting it in the operative position within the cartridge socket recess and its common four-pole gap 19 of the two core systems.

FIG. 3 shows in full lines the replaceable armature assembly designed for insertion into a removable front section of a phonograph cartridge from the rear face thereof. Such removable cartridge front section may be secured in operative position to the main rear section of the cartridge, for example, by a screw, such as described hereinafter in connection with FIGS. 16 to 22. Such replaceable armature assembly 20 may be provided at the rear end with a cap 110 of elastomer material, for instance, having forward tapering seating surfaces 111 for seating it against a complementary surface of front cartridge section 2–21. A rearward projection 112 of tube cap 110 comes into seating engagement with the front wall 89 of the main cartridge rear body 2–30 when the front section 2–21 with its armature assembly 20 are affixed thereto (FIGS. 17–22).

Figures 10, 11:
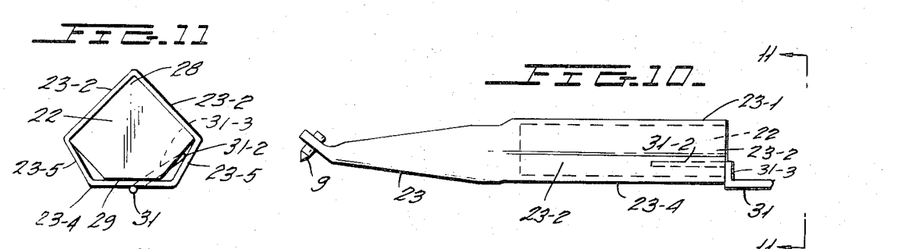
FIG. 10 is a side elevation of the armature stylus subassembly of FIG. 3.
FIG. 11 is a rear end view of this stylus and armature subassembly along line 11—11 of FIG. 10.

In accordance with the invention, the motion transmitting stylus arm connection 23 between the stylus 9 and the armature 22 is given the required minute mass while providing it with the required great motion transmitting stiffness by forming it as a hollow member tapering from a small forward cross-section to a wider rear section 23–1 tightly fitting and affixed to the surrounded armature 22 as seen in detail in FIGS. 10 to 11. As an example without thereby limiting the scope of the invention, such hollow stylus arm for the practical hi-fidelity stereophonic pickup of the invention consist of aluminum tubing which is deformed by a die set into the shape shown in FIGS. 10 and 11 having a thickness of .0015. The aluminum tubing 23 has a length from the stylus to the rear edge of .328″. The narrow front end of tube 23 is flattened having affixed therein a diamond stylus 9 of .042″ axial height, and is given an upwardly curved convex cross-section.

Although the armature 22 may be formed with a circular or curved cross-section circumference, the specific armature of FIGS. 3 to 5 is of generally rectangular or square cross-section and has a flattened downward wall surface 29 lying opposite the upper corner edge 28. The hollow rear end 23–1 of the stylus arm has two upper side walls 23–2 conforming in shape to and affixed as by cement or solder to the coextensive underlying upper side wall surfaces of the armature 22 which are perpendicular to each other. The bottom wall 23–4 of the hollow rear end 23–1 of the stylus arm 23 is flat and is similarly affixed to the overlying flat bottom surface of the armature 22 with the adjoining opposite side walls 23–5 tapering to the opposite side corner edges of armature 22 and being slightly spaced from the bottom side corner edge of the armature 22 (FIG. 11). The hollow stylus-arm rear portion 23–1 has thus a pentagon shaped cross-section shaped to engage and be affixed with its upper side walls 23–2 and the bottom side wall 23–4 to the underlying wall surfaces of armature 22, leaving narrow spaces between its two downward stylus-arm side walls 23–5 and the facing downward side walls of armature 22.

The front end of the bias spring wire 31 has an offset end portion 31–2 held affixed as by strong cement such as epoxy or polyester resin cement or solder to and between the side wall surfaces of the armature 22 and the overlying slightly spaced side wall 23–5 of the hollow stylus arm 23.

The cartridge recess passage 19 being of rectangular or square cross-section and extending with its axes diagonally downward is thereby polarized. The support tube 21 of replaceable armature assembly 20 has a complementary polarized characteristic shape, thereby assuring that it will be inserted into the cartridge recess 19 only in the properly oriented polarized relation with the armature stylus 9 directed in downward direction. Such polarized oriented relation is also provided in all later described modified embodiments of the invention.

Figure 14:
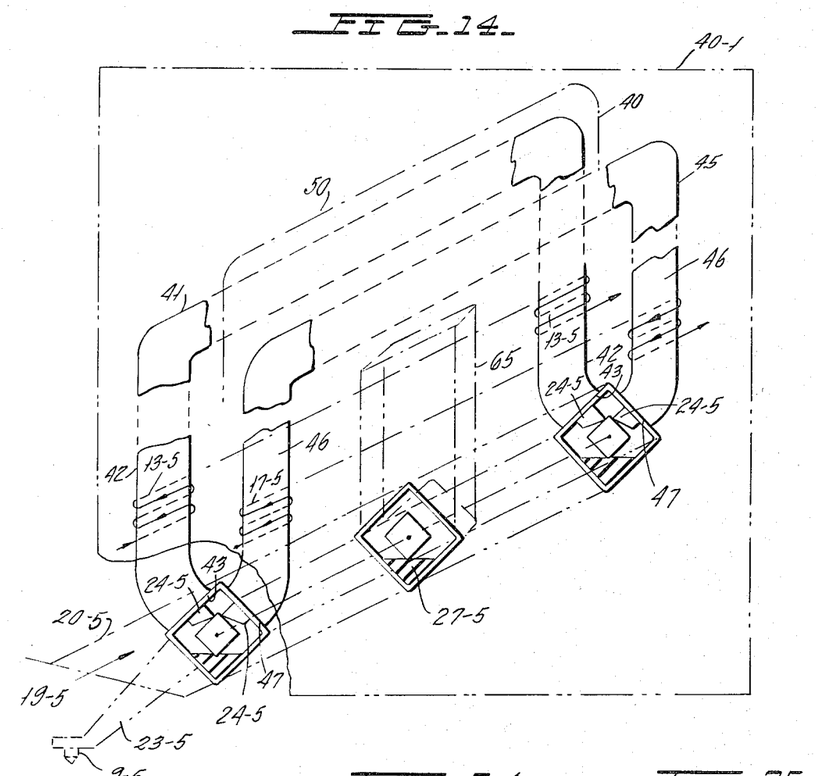
FIG. 14 is a diagrammatic view analogous to FIG. 1 showing another type of a stereophonic electromagnetic pickup having another type of an armature subassembly of the invention.

FIGURE 14 is a diagrammatic view analogous to that of FIGURE 1 of another type of stereophonic pickup cartridge having two core systems operating with a modified type replaceable armature assembly of the invention. It has a cartridge body 40 bounded by an exterior cartridge wall 40–1 holding in operative position two electromagnetic core systems 41, 45 on opposite sides of a central vertical plane of dash-dot lines 50. The two core systems 41, 45 are arranged in the manner analogous to those of U.S. Patent No. 3,067,295 and described in detail for example in connection with FIGS. 5 to 7 thereof.

Core system 41 has two opposite core poles 42 provided at their ends with pole faces 43 both facing one side of the vertical central cartridge plane 50. The other core system 45 likewise has two core poles 46 with pole end faces 47 facing the opposite side of the central vertical plane 50. The two adjacent pole faces 43 and 47 of the two distinct core systems 41, 45, a pole face pair extending transversely adjacent to each other on opposite sides of the central cartridge plane 50 on the left ends of the two core systems 41, 45. The other two core poles 42, 46 at the right ends of the two core systems 41, 45, likewise have their respective pair of ajacent planar pole faces 43, 47 disposed transversely to each other on opposite sides of the central cartridge plane 50. In practical pickups of this type, the adjacent two pole faces 43, 45 of each angularly disposed pole-face pair are 90° inclined to each other and 45° inclined to the common central cartridge plane 50.

Figure 15:
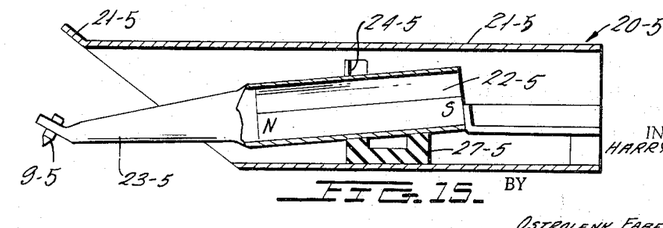
FIG. 15 is an elongated cross-sectional view similar to FIG. 3 of the replaceable armature assembly of the invention shown diagrammatically in FIG. 14.
Figure 16:
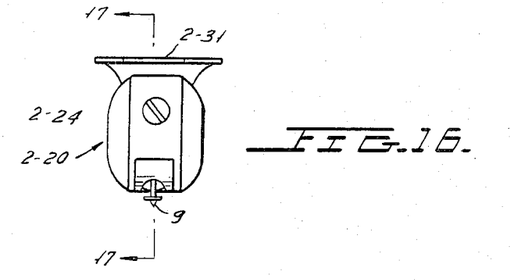
FIG. 16 is a front end view of one form of a practical phonograph pickup cartridge operating with which a replaceable armature assembly of the invention such as shown in FIGS. 3–5.

The two pair so aligned planar pole faces 43, 47 of the two core systems 41, 45 aligned on opposite sides of vertical central plane 50 define with the bottom wall of cartridge 40, a forwardly facing hollow socket space recess designated 19–5 with cartridge 40. Within the elongated socket passage recess 19–5 of cartridge 40 is operatively held a replaceable armature assembly designated 20–5, shown in cross-section in FIGURE 15. The core system of the pickup of FIGURES 14, 15 is analogous to that of FIGURES 1 to 5 except that the four planar pole faces of the two core system define only two downwardly facing 90° inclined socket surfaces, which together with the two complementary 90° inclined opposite cartridge wall surfaces 51, 52 define an elongated cartridge recess frictionally retaining in operative position an armature assembly 20–5 analogous to that of FIGURES 3–5.

The replaceable armature assembly 20–5 (FIG. 15), of the pickup of FIG. 14, combines the same cooperating elements as that described in connection with FIGURES 3 to 5 and they are identified by the same reference numerals except for the suffix "5." Thus, as an example, the tubular housing 21–5 of FIG. 15 and armature 22–5 of FIGURE 18 corresponds to the mounting tube 21 and armature 22 of the replaceable stylus assembly of FIGURES 3 to 5. Accordingly, the replaceable stylus assembly 20–5 of FIGURE 15 requires no further explanation except for the fact that the armature 22–5 and associated element thereof have greater axial length so as to vibrate along an intermediate portion thereof between the two pairs of 90° inclined planar pole face pairs 43, 47 disposed at the opposite left and right ends of the cartridge of FIGURE 14.

The armature 22–5 of the armature assembly of FIG. 14 is arranged to be vibrated by the stylus 9–5 with the same high degree of freedom of motion on the inward-pointed bearing ends of downwardly facing bearing projections 24–5 of mounting tube 21–5. A similar analogous compliant centrally disposed elastomer body 27–5 is positioned within the mounting tube 21–5 to bias armature 22–5 into pivotal engagement of a pivot with the inwardly pointed bearing projections 24–5 of mounting tube 21–5, as in the assembly of FIGURES 3 to 5.

The armature 22–5 may be permanently magnetized in longitudinal direction as indicated by N and S symbols at its opposite ends. In the cartridge of FIG. 14 having two electromagnetic core systems 41, and 45, the vibratory motion of the permanently magnetized armature 22–5 generates in the two respective system windings the complementary stereophonic signal sequences. Alternatively, the two core systems 41, 42 may be provided with suitably magnetized permanent magnet elements such as permanent magnet 65 for impressing a permanently magnetized field between the two pairs of planar pole faces 43, 47 of the two core systems 41, 45, in which case the armature 22–5 may be formed of highly permeable magnetic material free of permanent magnetization for operation in a manner analogous to known cartridges of this type, for example, such as described in U.S. Patent No. 3,067,295.

FIGURES 16–22 show the structure of one practical form of a stereophonic phonograph pickup cartridge 2–20, which operates with a replaceable armature assembly 20 described above in connection with FIGURES 1–13.

The stereophonic phonograph pickup cartridge 2–20 shown consists of three main assemblies 2–21, 20, 2–23 (FIGURE 20), held assembled in operative relation by clamping screw 2–24. Stylus 9 is at the forward end of elongated armature assembly 20, which is removably positioned in cartridge aperture or recess 2–26 of front cartridge section 2–21. Cartridge recess 2–26 extends diagonally forward and downward between the rear and of bottom sides of front section 2–21. The forward side of rear main cartridge body 2–23 extends slightly into the rear end of front section housing 2–27, which may be of metal.

Figure 20:
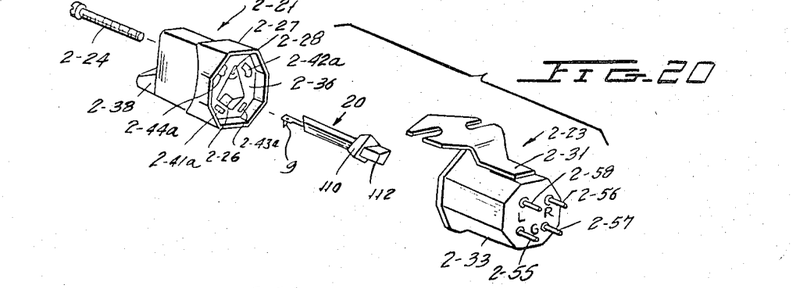
FIG. 20 is an exploded perspective of the principal components of the cartridge of FIGS. 16-19.
Figure 21:
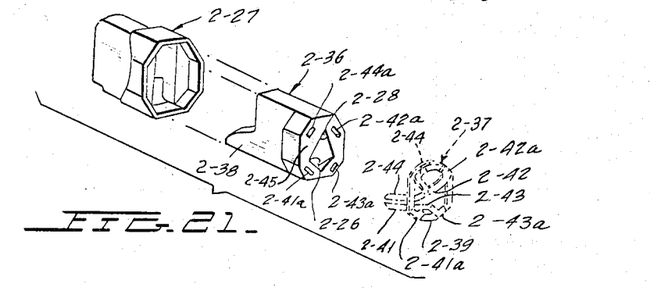
FIG. 21 is an exploded perspective of the components from the front section of the same cartridge.

Clamping screw 2–24 extends through aperture 2–28 of front cartridge section 2–21 and is affixed within threaded aperture 2–29 in the front wall of insulating support body 2–30 of rear cartridge section 2–23. Rear end 2–31 of mounting bracket 2–32 is welded to metal housing 2–33 of rear section 2–23. The forward end of bracket 2–32 is off-set upwardly and has two conventional slots for screws which affix the cartridge 2–20 to the conventional tone arm.

Front assembly section 2–21 (FIG. 21 and FIGS. 17, 20), includes molded insulating support body 2–36 in which the four pole-piece assembly 2–37 is encapsulated. Support 2–36 in which four pole-piece assembly 2–37 is encapsulated. Support 2–36 is disposed within metal housing 2–27 and has a front guard projection 2–38 extending beyond front of housing 2–27. Quadrature pole piece structure 2–37 (FIGURE 21), consists of permeable ferromagnetic pole pieces 2–41 through 2–44 each secured at one end, as by welding, to metal frame 2–39 to project forwardly in diamond or quadrature form. Pole piece frame 2–39 is constructed of a non-magnetic or low permeability material such as non-magnetic stainless steel. Pole pieces 2–41 to 2–44 have rear pole piece ends 2–41a to 2–44a, which are secured to frame 2–39 are turned to be flush with the back surface 2–45 at front section insulating support 2–36, so as to directly engage the turned forward ends 2–51a through 2–54a of main pole pieces 2–51 to 2–54, respectively (FIGS. 20 and 17), of main cartridge rear body 2–23.

Now referring more to rear cartridge section 2–23 seen in FIGS. 17–20 and 22. Section 2–23 has four pole-pieces 2–51 to 2–54 passing through apertures 2–61 to 2–64, respectively in rear-body front wall or cover 2–30. These pole pieces 2–51 to 2–54 have laterally bent front pole ends 2–51a to 2–54a, which are exposed on the forward side of rear body 2–30. After passing through apertures 2–61 through 2–64 of body 2–30, the four pole pieces 2–51 to 2–54 pass the central apertures of four coil forms 71 to 74 respectively. In the same four coil-form apertures are held four rear pieces 81 to 84 which project frontward from a common rear connecting portion 87, so they make intimate magnetic contact with the rearwardly extending pole pieces 2–51 to 2–54, respectively held in these coil-form apertures.

Figures 17, 18, 19:
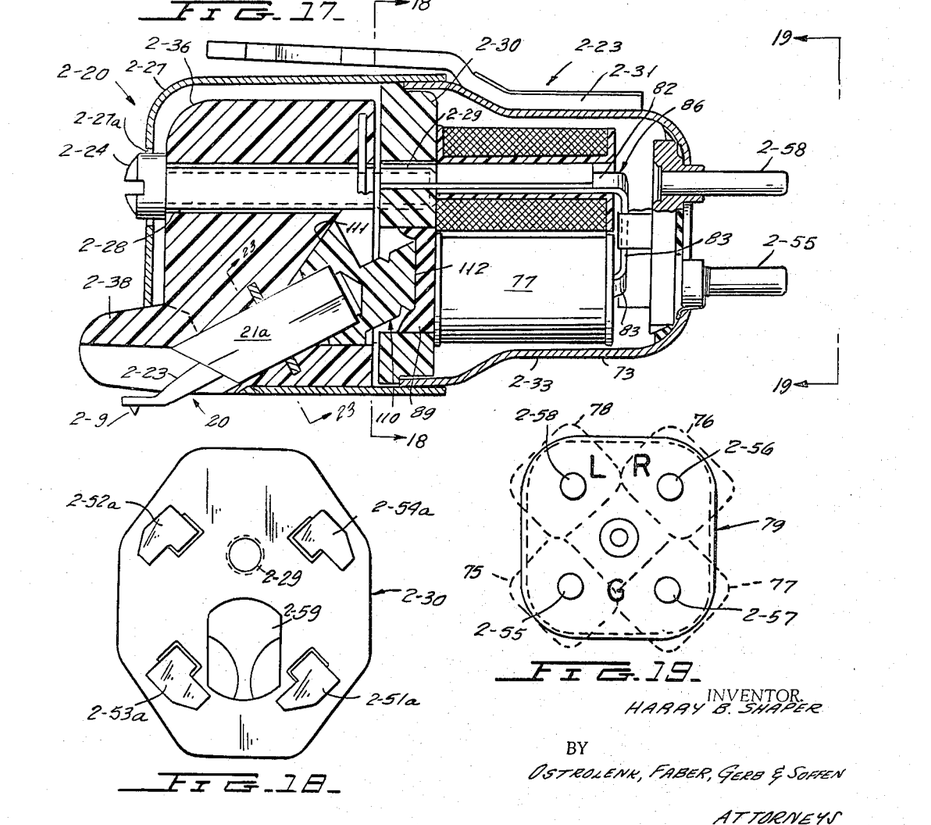
FIG. 17 is a longitudinal cartridge cross-section along lines 17—17 of FIG. 16.
FIG. 18 is a front elevation of the main rear cartridge body along lines 18—18 of FIG. 17.
FIG. 19 is a cartridge rear end view along lines 19—19 of FIG. 17.
Figure 22:
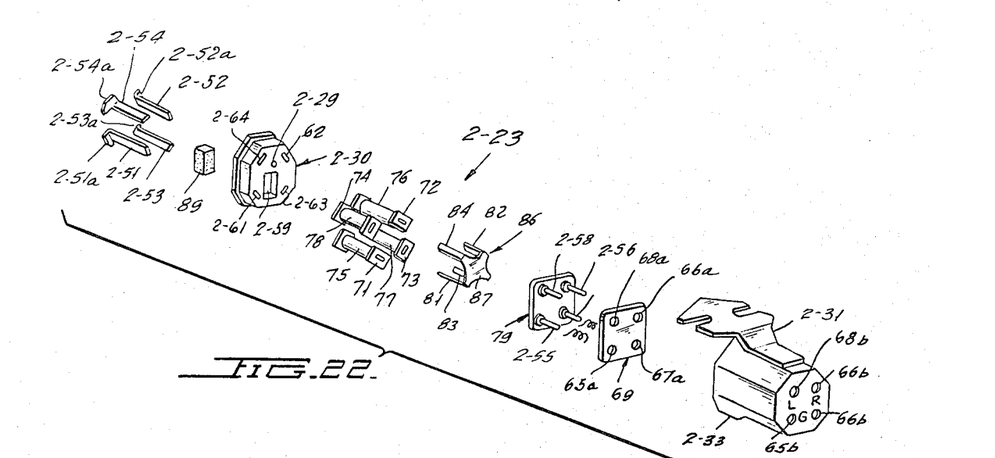
FIG. 22 is a similar exploded perspective of the components of the main rear body of the same cartridge.

Rear surface of common pole piece connecting portion 87 is secured to insulating support plate 79 of rear section 2–23 (FIGS. 22, 20, 17). Terminal plate 79 has four rearwardly extending terminal prongs 2–55 to 2–58, which are connected to the coils of the four coil 75–78 on forms 71 to 74, respectively. Terminal prongs 2–55 to 2–58 extend through apertures 65a to 68a, respectively, of insulating cushion 69 and through apertures 65b to 68b, of rear wall of rear body housing 2–33. A resilient bearing block 89 is positioned in apertures 2–59 of body 2–30 of main rear cartridge section 2–23 for a reason hereinafter explained. A plastic insulating cement injected into housing 2–33 after assembling therein the abovedescribed component maintains them affixed in their operative positions.

As described above, the rear end of armature assembly mounting tube or sleeve 21 has affixed an insulating cap 110. The replaceable armature assembly 20 (FIGS. 1–5), of square cross-section described above is arranged for insertion with frictional fit into the correspondingly-shaped diagonal recess passage 2–26 of front cartridge section 2–21.

Starting with the components and sub-assemblies arranged as in FIGURE 20, the cartridge 2–20 is assembled by inserting the forward end of armature assembly 20 into aperture 2–26 from the rear side of front cartridge section 2–21 until the tapered cap shoulder 111 abuts the facing tapered seating portion of insulating support 2–36 adjoining aperture passage 2–26. Thereafter, the forward end of main rear body portion 2–23 is inserted into the rear end of front housing 2–27 with the rear surface 112 of armature-assembly cap engaging elastomer bias block 89 of rear body 2–23. Clamping screw 2–24 is then inserted through front housing wall aperture 2–27a and front section aperture 2–28, and affixed in threaded aperture 2–29 of main rear body cover member 2–30. Tightening of screw 2–24 causes cartridge body portions 2–21 and 2–23 to converge thereby forcing elastic bearing block 89 against rear cap surface 112 of armature assembly 20, and assuring firm seating of cap shoulder 111 against facing insulating support 2–36 of front main section 2–21. 78(11)—GILFORD—34730—NITE PATS—NOV. 14

Figure 23:
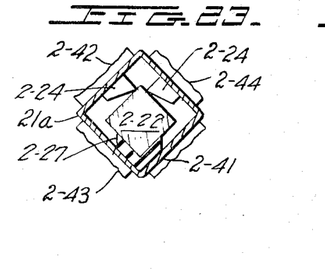
FIG. 23 is a cross-sectional view of the armature assembly along line 23—23 of FIG. 17 together the pole ends of the two core systems forming the common four-pole gap of the same cartridge.

The free front ends of the four pole pieces 2–41 to 2–44 of cartridge front section 2–21 constitute quadrature pole faces positioned parallel to the faces of permanent magnet armature 22 and form a common four pole gap therefor (FIG. 23). Further, these pole faces 2–41 to 2–44 constitute parts of the socket boundaries of aperture or passage 2–26 of front cartridge section 2–21 (FIGURE 20). The forward end of armature assembly tube 21 is diagonally cut. Thus, as armature assembly 20 is inserted in oriented position into aperture passage 26 of front cartridge section 2–21, the close frictional fit between armature assembly tube or sleeve 21 and aperture recess 2–26 of front cartridge causes the outer surfaces of assembly sleeve 21 to engage the front pole faces of pieces 2–43, 2–44 correspond to the other pole pair 18 of the FIGS. 1–5. In this manner, the neutral position of per-manent magnet armature 22 relative to the planar pole faces of the pole faces 2–41 to 2–44 of the common gap is accurately established. In this cartridge of FIGS. 16–2, the opposite front section pole pairs 2–41, 2–42 correspond to pole pair 12 and the other opposite pole pairs 2–43, 2–44 correspond to the other pole pair 18 of the two core systems shown diagrammatically in FIG. 1.

As should be obvious to those skilled in the art, with cartridge 2–20 assembled, two parallel magnetic paths are present for the flux generated by permanent magnet armature 22. These two paths are so similar that only one shall be described. One such path extends from magnet armature 2–22 through to the pole end of pole piece 2–41, through pole piece 2–41 to exposed rear end 2–41a thereof. Rear pole piece end 2–41a abuts pole end portion 2–51a at the exposed forward end of intermediate pole piece 2–51, through pole piece 2–51, in coil form where it passes through contracted rear pole piece 81, returning through common rear core plate 87 and opposite pole piece 86 and its contracting intermediate pole piece 2–52, and through its contact with front section pole piece 2–42 back to armature 20.

In the replaceable armature assembly of the invention shown in FIGURE 23, the inward bearing projections 2–24 of assembly tube 21a are of such an inward radial length as to maintain the freely vibrating armature 2–22 displaced downward from the common gap center in accordance with the invention claimed in my copending application Ser. No. 248,586 filed Dec. 31, 1962. Otherwise the armature assembly of FIG. 23 is similar to that described in connection with FIGS. 3–13.

Obviously, a cartridge of the type shown in FIGS. 16–23 could be made with the front section 2–21 being an integral part with the main rear section 2–23 in accordance with conventional practice. In such integral cartridge body the four front pole pieces 2–41 to 2–44 would be integral front extensions on the intermediate pole pieces 2–51 to 2–54 of the main body section and the assembled components could be affixed in their operative position by solidification of an injected fluid resin.

With a so modified cartridge, the replaceable armature assembly 20 of FIGS. 3–5 will be similar to that shown in FIG. 15. It will not have the rear cap 10. The front end of its outer assembly tube 21 will extend with upper wall corner frontward beyond the cartridge, as indicated at 21–6a in FIG. 3 so that it may be gripped by upward grip end 21–6 for removal from and insertion into its operative position between the common four-pole gap in the cartridge recess 19.

Figure 24:
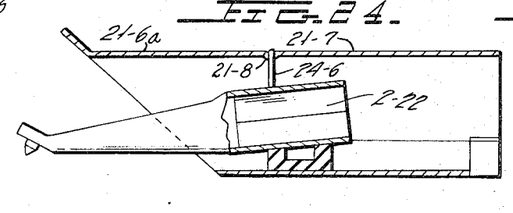
FIGS. 24 and 25 corresponding to FIGS. 3 and 4 show a modified form of an armature assembly of the invention.
Figure 25:
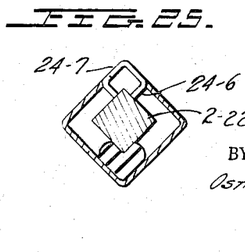

FIGS. 24 and 25 correspond to FIGS. 3 and 4 and show a further modification of a replaceable armature assembly of the invention. It combines the same components as the assembly described in connection with the FIGS. 3 to 5, which are identified by the same reference numerals except for the distinctions explained below. In the assembly of FIGS. 24, 25, the radially inward bearing projection 24–6 are formed by stiff end portions of a stiff metallic wire 24–7 of spring steel alloy, for instance, which is affixed, by solder, for example within a correspondingly shallow transverse recess 21–8 formed in the assembly tube 21–7. Assembly tube 21–7 has two small holes through which the bearing projections 24–6 of the wire 24–7 are inserted into their operative position shown. The bearing projection ends 24–6 are bent into their operative positions shown, for example after inserting them in a vertically downward position through the tube openings of tube 21–7. Alternatively, the wire 24–7 may be given the final shape shown and its bearing projections 24–6 elastically deformed when inserted through tube openings into their operative position shown.

Figure 26:
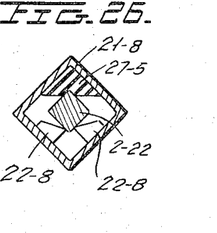
FIG. 26 is a view similar to FIG. 23 of a further modification of such armature assembly.

The various replaceable armature assemblies of the invention may also be modified by reversing in vertical direction the placement of the metallic bearing projection and the oppositely positioned elastomer body. Such modification is seen in the crossection view of FIG. 26 which otherwise is similar to FIG. 23. The two downwardly facing inclined side walls of metallic tube 21-8 of the armature assembly have two upward pivot projections 22-8 on which the armature 2-22 is pivoted by the stylus. An elastomer damping body 27-5 is interposed between the upper edge region of the armature 2-22 and the overlying corner region of the tube 21-8.

For the purpose of this specification and the claims hereof the following definitions are adopted: The expressions "upward" as applied to a phonograph cartridge is defined as the direction away from the record surface. The expression "generally rectangular" cross-section, as applied for instance to the armature 22 of the armature assembly seen in FIGS. 3–5 means also the pentagon shaped cross-section of the armature.

The novel principles of the invention disclosed herein in connection with specific exemplifications will suggest various modifications thereof. It is accordingly desired that in construing the appended claims, they shall not be limited to the specific exemplifications of the invention described above.

I claim:

1. An armature-stylus assembly adapted to be removably mounted in a recess extending through a common gap defined by pole faces of first and second electromagnetic systems in a magnetic pickup cartridge; said assembly comprising an elongated sleeve, an elongated movable subassembly disposed within said sleeve, bearing means within said sleeve supporting said subassembly for angular vibration about first and second vibration axes; said subassembly including a stylus at one end thereof and an armature disposed remote from said one end; said stylus extending beyond the confines of said sleeve through a first end thereof and adapted to transmit vibrations to said armature; said stylus including a downwardly facing tip; said bearing means including an elastomer means; said bearing means also including stiff bearing means constructed of metal extending transverse to the longitudinal axis of said sleeve and inwardly from said sleeve into direct engagement with a rigid portion of said subassembly.

2. An armature-stylus assembly as set forth in claim 1 in which the elastomer means is above the stiff bearing means.

3. An armature-stylus assembly as set forth in claim 1 in which the elastomer means is below the stiff bearing means.

4. An armature-stylus assembly as set forth in claim 1 also comprising spring means connected between said sleeve and said subassembly and biasing the latter toward said stiff bearing means.

5. An armature-stylus assembly as set forth in claim 1 in which the elastomer means engages said subassembly at first and second regions spaced along the length thereof.

6. An armature-stylus assembly as set forth in claim 5 in which the first region is aligned with said stiff bearing means and positioned closer to said stylus than said second region.

7. An armature-stylus assembly as set forth in claim 1 in which said stiff bearing means includes first and second projections extending along converging lines.

8. An armature-stylus assembly as set forth in claim 7 in which the projections are essentially in point contact engagement with the subassembly.

9. A phonograph pickup including a body means having an elongated recess; first and second electromagnetic systems each having pole face means; said pole face means of both of said systems combining to define a gap common to both of said systems with said recess extending through said gap; an elongated movable subassembly; bearing means within said recess supporting said subassembly for angular vibration; said subassembly including a stylus at one end thereof and an armature disposed remote from said one end and extending into said gap; said stylus extending beyond the confines of said recess through a lower end thereof and including a downwardly facing tip; said bearing means including an elastomer means; said bearing means also including stiff bearing means constructed of metal extending generally transverse to the longitudinal axis of the subassembly into direct engagement with a rigid portion of the subassembly.

10. A phonograph pickup as set forth in claim 9 in which the pole face means of each of said systems includes opposed pole faces; said pole faces positioned edge to edge and equally spaced from each other with opposed pole faces of the first system interposed between opposed pole faces of the second systems; said pole faces of each of said systems disposed with the longitudinal axis of said recess extending therebetween; one of said stiff bearing means and said elastomer means positioned above the longitudinal axis and the other positioned therebelow.

11. A phonograph pickup as set forth in claim 10 in which the stiff bearing means includes first and second projections extending along converging lines.

12. A phonograph pickup as set forth in claim 11 in which the elastomer means is positioned opposite said stiff bearing means.

13. A phonograph pickup as set forth in claim 12 in which the projections are essentially in point contact engagement with said subassembly.

References Cited

UNITED STATES PATENTS

| 3,077,522 | 2/1963 | Gunter | 179—100.41 |
| 3,297,831 | 1/1967 | Stanton | 179—100.41 |

BERNARD KONICK, *Primary Examiner.*

L. H. HILL, J. R. GOUDEAU, *Assistant Examiner.*